US011117511B2

(12) United States Patent
Fujiyama et al.

(10) Patent No.: US 11,117,511 B2
(45) Date of Patent: Sep. 14, 2021

(54) VEHICLE LIGHTING CONTROL APPARATUS, VEHICLE LIGHTING CONTROL METHOD, AND COMPUTER READABLE MEDIUM

(71) Applicant: Mitsubishi Electric Corporation, Tokyo (JP)

(72) Inventors: Naoyuki Fujiyama, Tokyo (JP); Ryota Sekiguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/970,665

(22) PCT Filed: Mar. 29, 2018

(86) PCT No.: PCT/JP2018/013136
§ 371 (c)(1),
(2) Date: Aug. 18, 2020

(87) PCT Pub. No.: WO2019/186863
PCT Pub. Date: Oct. 3, 2019

(65) Prior Publication Data
US 2020/0377007 A1    Dec. 3, 2020

(51) Int. Cl.
*B60Q 1/24*       (2006.01)
*G08G 1/01*       (2006.01)
(Continued)

(52) U.S. Cl.
CPC .............. *B60Q 1/24* (2013.01); *G08G 1/0137* (2013.01); *G08G 1/04* (2013.01); *H05B 47/125* (2020.01)

(58) Field of Classification Search
CPC ...... B60Q 1/24; B60Q 1/085; B60Q 2300/45; G08G 1/01; G08G 1/04; G08G 1/0137;
(Continued)

(56) References Cited

U.S. PATENT DOCUMENTS 7,543,677 B2 *  6/2009  Igawa ................. B60R 21/0134
                                                    180/274
7,733,464 B2 *  6/2010  David .................... G02B 23/12
                                                    356/5.03
(Continued)

FOREIGN PATENT DOCUMENTS

JP       2000-318513 A     11/2000
JP       2006-21631 A      1/2006
(Continued)

OTHER PUBLICATIONS

International Search Report issued in PCT/JP2018/013136 (PCT/ISA/210), dated Jun. 19, 2018.
(Continued)

*Primary Examiner* — Haissa Philogene
(74) *Attorney, Agent, or Firm* — Birch, Stewart, Kolasch & Birch, LLP

(57) ABSTRACT

A vehicle lighting control apparatus includes a detection unit and a light control unit. The detection unit detects a target object present outside an illumination range of a low beam of a vehicle, using a device such as a far-infrared camera. The light control unit illuminates a range in which the target object detected by the detection unit is present with a marking light that can illuminate an area at a greater distance when compared with the low beam, thereby allowing a driver to recognize the target object.

9 Claims, 15 Drawing Sheets

(51) Int. Cl.
*H05B 47/125* (2020.01)
*G08G 1/04* (2006.01)

(58) Field of Classification Search
CPC ...... H05B 47/10; H05B 47/125; H05B 45/20; Y02B 20/40; B60R 21/0134; G06K 9/00362; G06K 9/00805
See application file for complete search history.

(56) References Cited

U.S. PATENT DOCUMENTS

| | | | |
|---|---|---|---|
| 9,771,021 B1* | 9/2017 | Lindsay | B60Q 1/085 |
| 10,366,603 B2* | 7/2019 | Ohta | G08G 1/04 |
| 10,618,458 B2* | 4/2020 | Yuchi | B60Q 1/085 |
| 10,949,683 B2* | 3/2021 | Kawamata | G06K 9/00798 |
| 2011/0068910 A1 | 3/2011 | Iwai et al. | |
| 2012/0308082 A1 | 12/2012 | Murao et al. | |
| 2014/0062685 A1* | 3/2014 | Tamatsu | B60Q 5/005 340/425.5 |
| 2014/0085476 A1 | 3/2014 | Toyofuku | |
| 2017/0352275 A1* | 12/2017 | Maruyama | G08G 1/165 |
| 2020/0398737 A1* | 12/2020 | Fujiyama | G01S 17/931 |
| 2020/0410274 A1* | 12/2020 | Satoh | H04N 5/2258 |

FOREIGN PATENT DOCUMENTS

| | | |
|---|---|---|
| JP | 2007-30739 A | 2/2007 |
| JP | 2007-99235 A | 4/2007 |
| JP | 2008-100612 A | 5/2008 |
| JP | 2008-181711 A | 8/2008 |
| JP | 2008-230333 A | 10/2008 |
| JP | 2010-18165 A | 1/2010 |
| JP | 2012-151058 A | 8/2012 |
| JP | 2012-250668 A | 12/2012 |
| JP | 2013-118146 A | 6/2013 |
| JP | 2013-184614 A | 9/2013 |
| JP | 2015-33939 A | 2/2015 |
| JP | 2016-110853 A | 6/2016 |
| JP | 2017-165178 A | 9/2017 |
| JP | 6288208 B1 | 3/2018 |
| WO | WO 2012/164729 A1 | 12/2012 |
| WO | WO 2016/093154 A1 | 6/2016 |

OTHER PUBLICATIONS

Notification of Reasons for Refusal, Office Action for Japanese Application No. 2018-548941, dated Nov. 13, 2018.

* cited by examiner

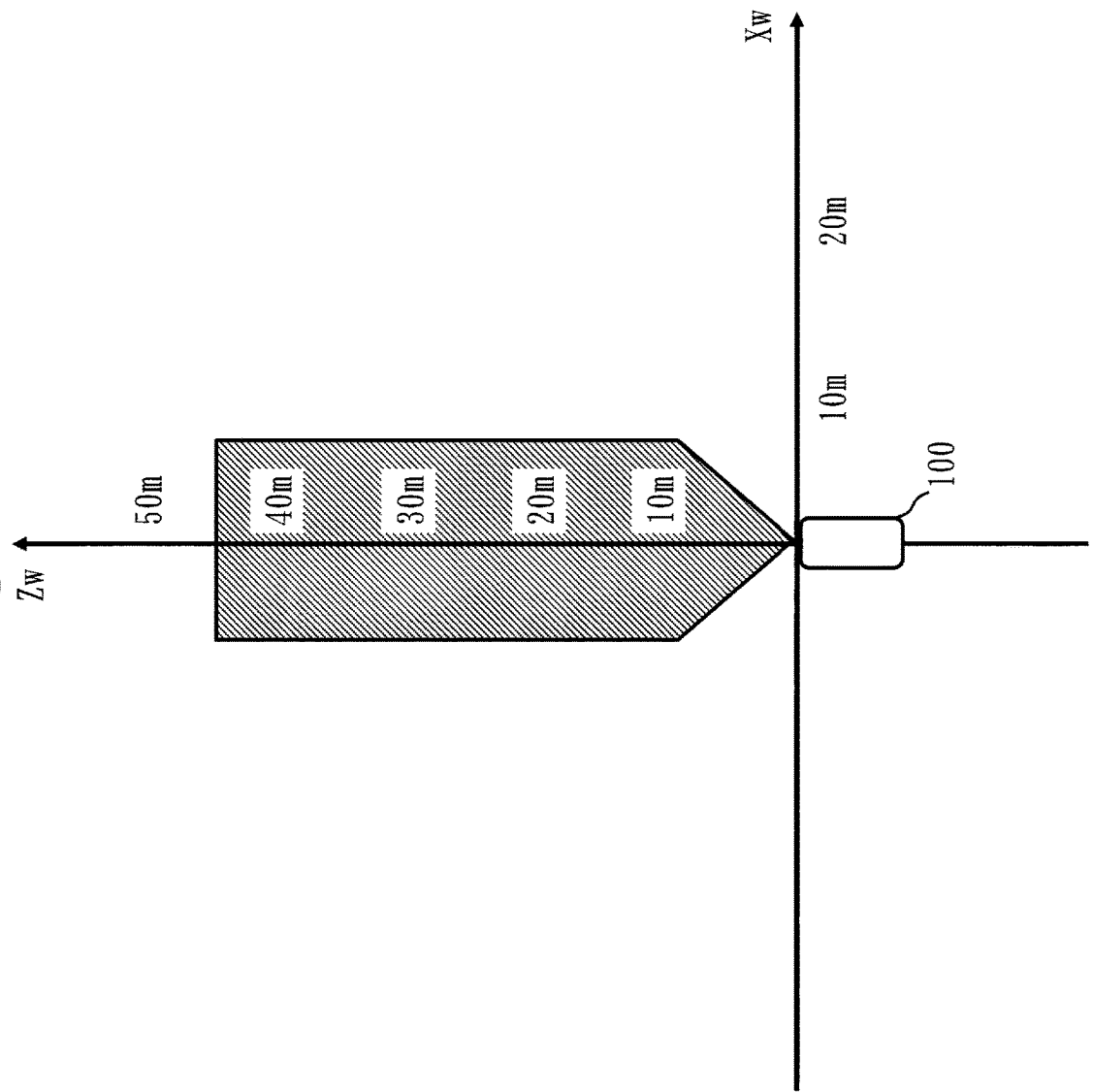

VEHICLE LIGHTING CONTROL APPARATUS, VEHICLE LIGHTING CONTROL METHOD, AND COMPUTER READABLE MEDIUM

TECHNICAL FIELD

The present invention relates to a technology to control lighting mounted on a vehicle.

BACKGROUND ART

There is a vehicle headlight equipped with a function known as adaptive driving beam (hereinafter ADB), which changes an illumination area of a light distribution pattern by controlling the turning on and off of each light emitting device of semiconductor light emitting devices such as LEDs arranged in a matrix. The ADB function detects the motion status of a pedestrian near the vehicle by use of a sensor such as a monocular camera, and realizes partial turning on and off of lights toward the pedestrian so as not to dazzle the pedestrian (see Patent Literature 1).

CITATION LIST

Patent Literature

Patent Literature 1: JP 2016-110853 A

SUMMARY OF INVENTION

Technical Problem

However, if the lights are partially turned off toward the pedestrian so as not to dazzle the pedestrian, a driver will not be able to visually recognize the pedestrian. Therefore, there is a risk of overlooking the pedestrian crossing a road and colliding with the pedestrian.

It is an object of the present invention to facilitate the recognition a target object such as a pedestrian by a driver.

Solution to Problem

A vehicle lighting control apparatus according to the present invention includes a detection unit to detect a target object present outside an illumination range of a low beam of a vehicle; and a light control unit to illuminate a range in which the target object detected by the detection unit is present with a marking light that can illuminate an area at a greater distance when compared with the low beam.

Advantageous Effects of Invention

In the present invention, a target object present outside an illumination range of a low beam is illuminated by a marking light. This allows a driver to recognize a target object in the distance that cannot be recognized in a situation in which only the low beam is used.

BRIEF DESCRIPTION OF DRAWINGS

FIG. 15 is a diagram describing an illumination range of a low beam according to the second embodiment.

DESCRIPTION OF EMBODIMENTS

First Embodiment

Description of Configuration

Figure 1:
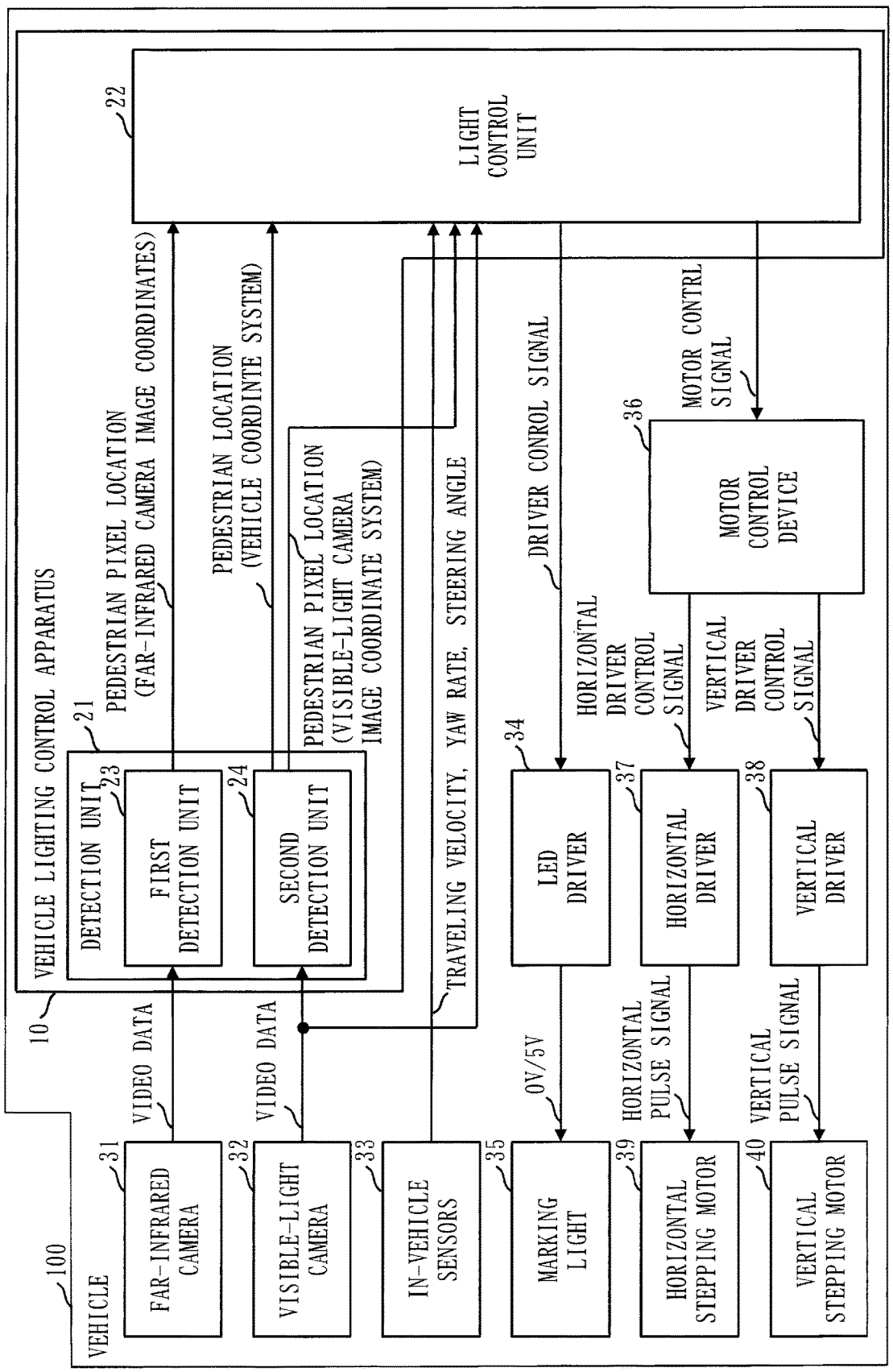
FIG. 1 is a configuration diagram of a vehicle lighting control apparatus 10 according to a first embodiment.

Referring to FIG. 1, a configuration of a vehicle lighting control apparatus 10 according to a first embodiment will be described.

The vehicle lighting control apparatus 10 is a computer, such as an electronic control unit (ECU), to be mounted on a vehicle 100. The vehicle lighting control apparatus 10 may be implemented in a form integrated with and inseparable from the vehicle 100, or may be implemented in a form separable from the vehicle 100.

The vehicle lighting control apparatus 10 includes a detection unit 21 and a light control unit 22 as functional components. The detection unit 21 includes a first detection unit 23 and a second detection unit 24. In the first embodiment, the light control unit 22, the first detection unit 23, and the second detection unit 24 are implemented by ECUs independent of one another. Note that two or more of the light control unit 22, the first detection unit 23, and the second detection unit 24 may be implemented by one ECU.

In addition to the vehicle lighting control apparatus 10, also mounted on the vehicle 100 are a far-infrared camera 31, a visible-light camera 32, in-vehicle sensors 33, an LED driver 34, a marking light 35, a motor control device 36, a horizontal driver 37, a vertical driver 38, a horizontal stepping motor 39, and a vertical stepping motor 40.

Figure 2:
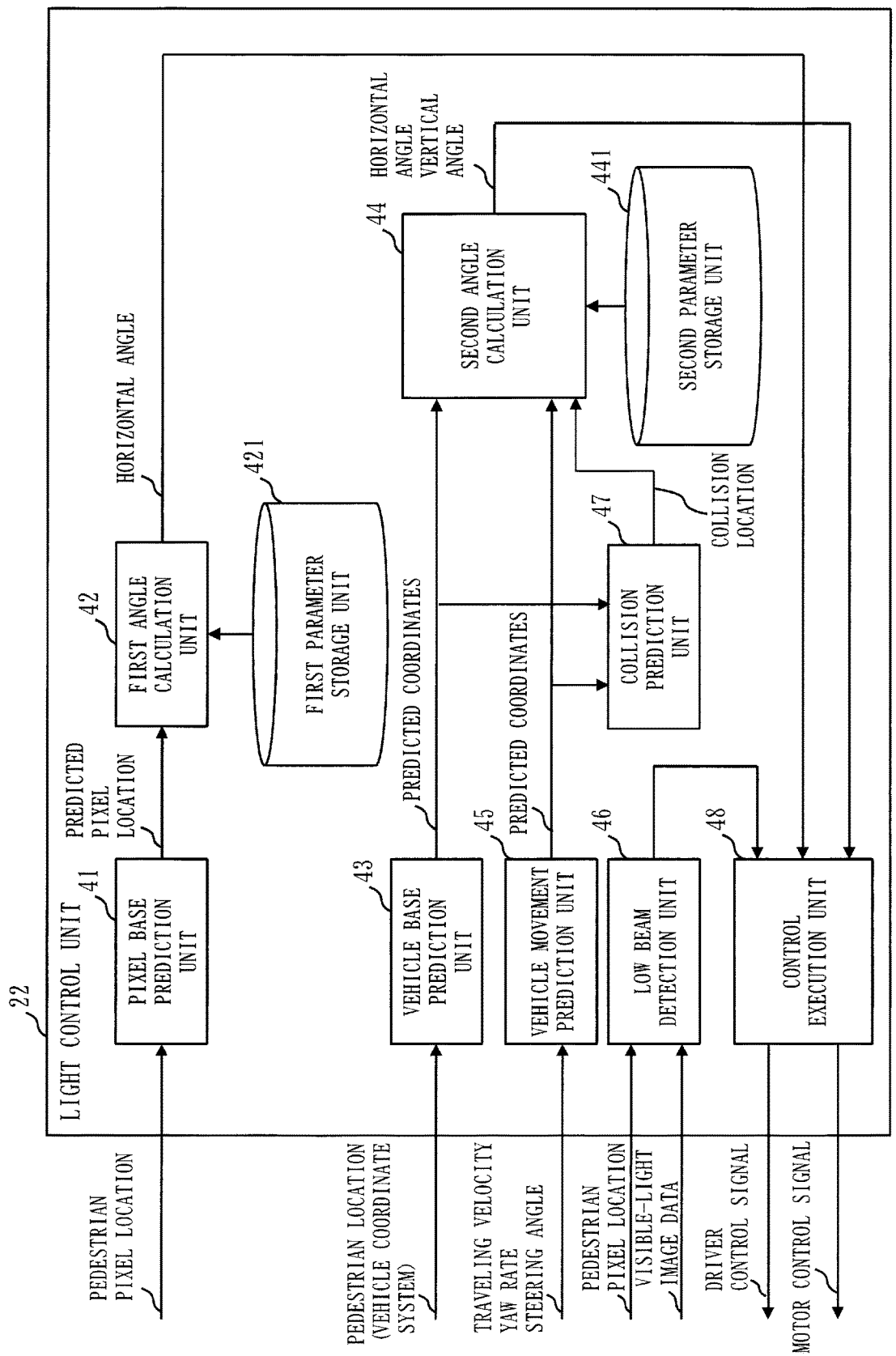
FIG. 2 is a configuration diagram of a light control unit 22 according to the first embodiment.

Referring to FIG. 2, a configuration of the light control unit 22 according to the first embodiment will be described.

The light control unit 22 includes, as functional components, a pixel base prediction unit 41, a first angle calculation unit 42, a vehicle base prediction unit 43, a second angle calculation unit 44, a vehicle movement prediction unit 45, a low beam detection unit 46, a collision prediction unit 47, and a control execution unit 48. The functional components included in the light control unit 22 are realized by software.

A memory is mounted on the ECU that realizes the light control unit 22, and programs for realizing the functions of the functional components are stored in the memory. These programs are read by a processor, which is an integrated circuit (IC) that performs processing, and are executed by the processor. This realizes the functions of the functional components included in the light control unit 22.

The memory realizes the functions of a first parameter storage unit 421 and a second parameter storage unit 441.

The functions of the first detection unit 23 and the second detection unit 24 are also realized by software as in the case of the functions of the functional components of the light control unit 22.

Note that the functions of the light control unit 22, the first detection unit 23, and the second detection unit 24 may be realized by hardware, such as an ASIC and an FPGA, instead of software. The hardware, such as the processor, the ASIC, and the FPGA, is processing circuitry. That is, the functions of the light control unit 22, the first detection unit 23, and the second detection unit 24 are realized by the processing circuitry.

Description of Operation

Referring to FIGS. 3 to 9, operation of the vehicle lighting control apparatus 10 according to the first embodiment will be described.

The operation of the vehicle lighting control apparatus 10 according to the first embodiment corresponds to a vehicle lighting control method according to the first embodiment. The operation of the vehicle lighting control apparatus 10 according to the first embodiment also corresponds to processes of a vehicle lighting control program according to the first embodiment.

In the first embodiment, a target object is assumed to be a pedestrian. However, the target object is not limited to the pedestrian and may be other types such as a bicycle, an animal, and a vehicle during a parking operation.

Figure 3:
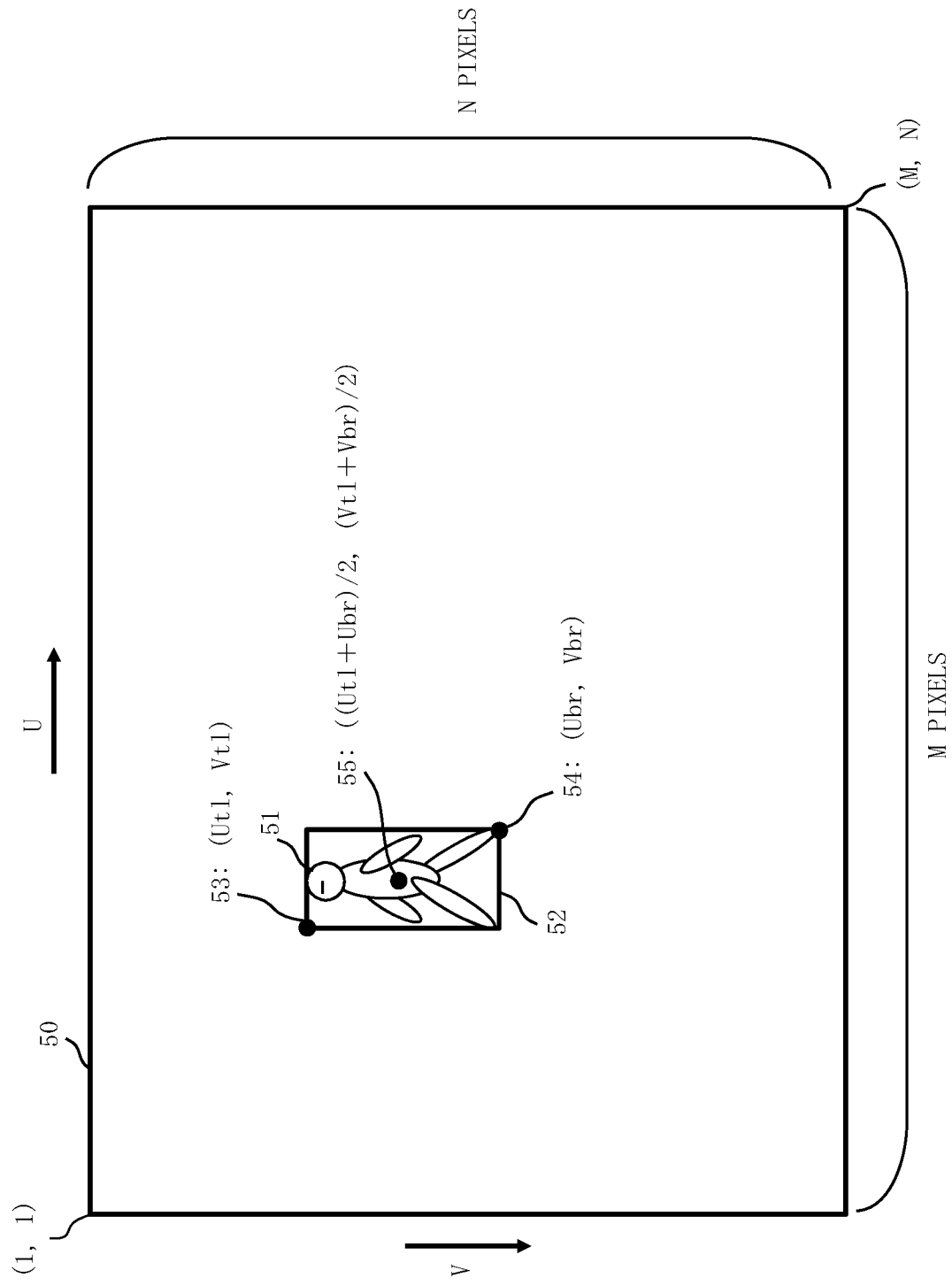
FIG. 3 is a diagram illustrating an image coordinate system 50 of an image obtained by a far-infrared camera 31 and a visible-light camera 32 according to the first embodiment.
Figure 4:
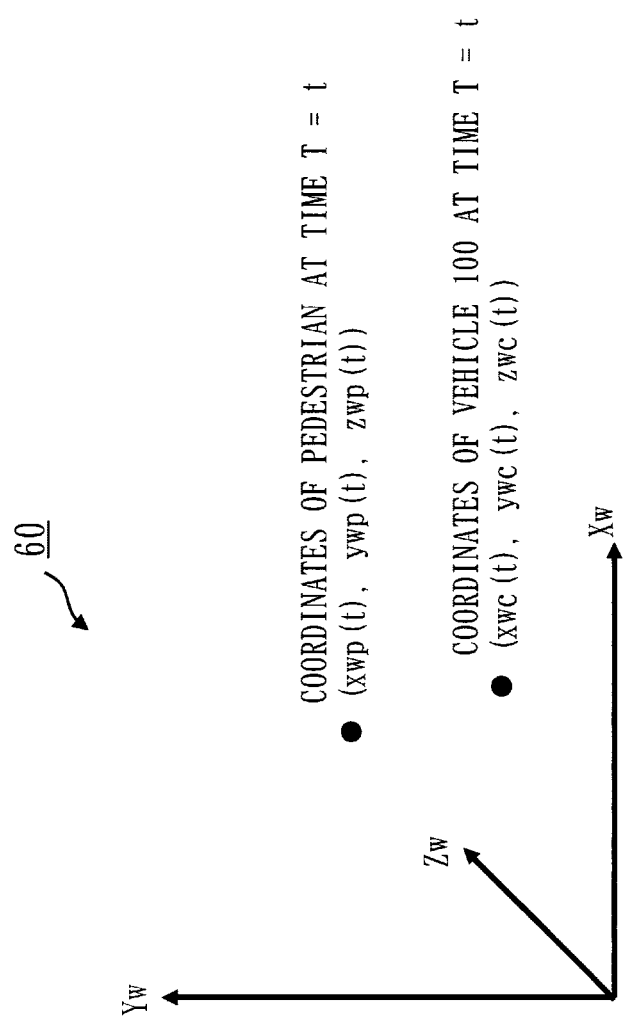
FIG. 4 is a diagram illustrating a vehicle coordinate system 60 according to the first embodiment.
Figure 5:
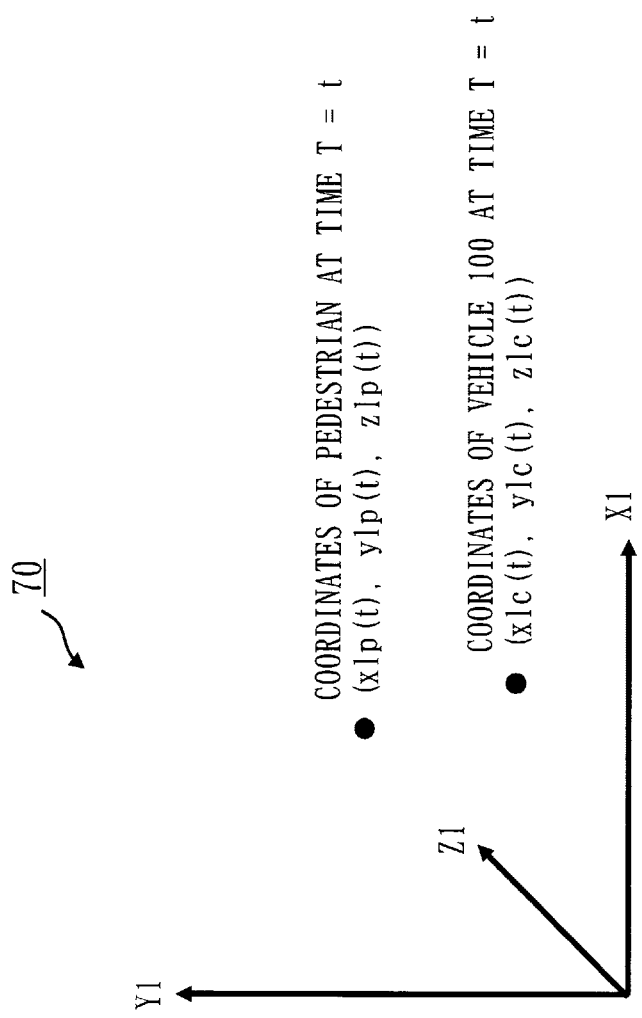
FIG. 5 is a diagram illustrating a light coordinate system 70 according to the first embodiment.

Referring to FIGS. 3 to 5, mathematical definitions according to the first embodiment will be described.

As illustrated in FIG. 3, an image coordinate system 50 obtained by the far-infrared camera 31 is such that a horizontal axis that is positive to the right is a U axis and a vertical axis that is positive in a downward direction is a V axis. When an image with horizontal M pixels and vertical N pixels is obtained, a pixel location at the top left corner is represented as (1, 1), a pixel location at the bottom right corner is represented as (M, N), and any pixel location in the range of $1 \leq u \leq M$ and $1 \leq v \leq N$ is represented as (u, v).

The detection range of a pedestrian 51, which is a target object imaged by the far-infrared camera 31, is represented as a detection frame 52. A top-left pixel location 53 of the detection frame 52 is represented as (Utl, Vtl), and a bottom-right pixel location 54 is represented as (Ubr, Vbr). Center coordinates 55 of the detection frame 52 are ((Utl+Ubr)/2, (Vtl+Vbr)/2).

An image coordinate system obtained by the visible-light camera 32 is also defined in the same manner as the image coordinate system 50 obtained by far-infrared camera 31.

Accordingly, the same variables are used also for the image coordinate system obtained by the visible-light camera 32.

As illustrated in FIG. 4, a vehicle coordinate system 60 is such that a traveling direction of the vehicle 100 is a Zw axis, and an Xw axis and a Yw axis are defined using the left-handed system. The coordinates of the pedestrian in the vehicle coordinate system 60 at a given time T=t are represented as (xwp(t), ywp(t), zwp(t)). The coordinates of the vehicle 100 in the vehicle coordinate system 60 at the given time T=t are represented as (xwc(t), ywc(t), zwc(t)).

As illustrated in FIG. 5, a light coordinate system 70 is such that an illumination direction of light is a Z1 axis, and an X1 axis and a Y1 axis are defined using the left-handed system. The coordinates of the pedestrian in the light coordinate system 70 at the given time T=t are represented as (xlp(t), ylp(t), zlp(t)). The coordinates of the vehicle 100 in the light coordinate system 70 at the given time T=t are represented as (xlc(t), wlc(t), zlc(t)).

Figure 6:
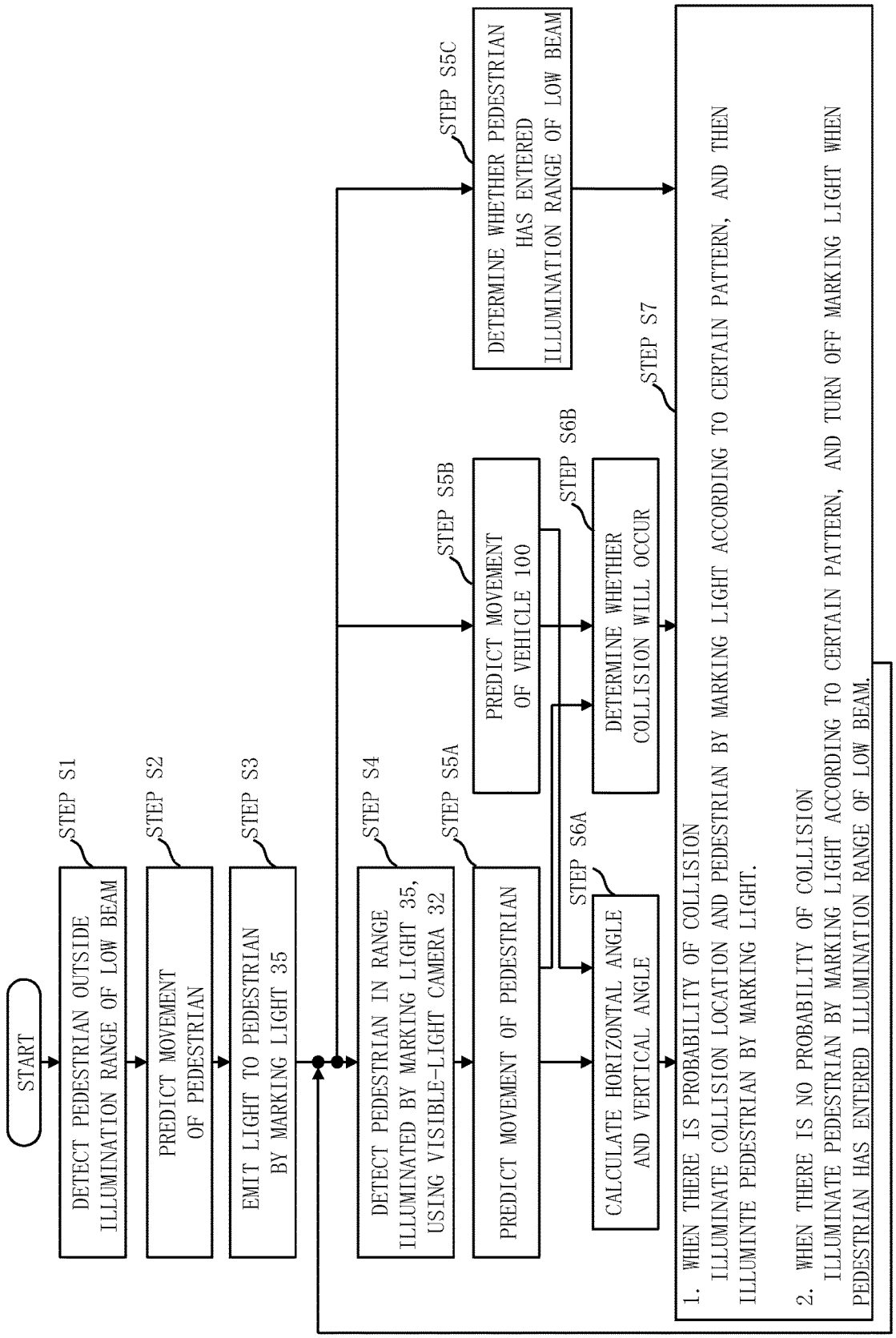
FIG. 6 is a flowchart illustrating operation of the vehicle lighting control apparatus 10 according to the first embodiment.

Referring to FIG. 6, the operation of the vehicle lighting control apparatus 10 according to the first embodiment will be described.

(Step S1: First Detection Process)

The first detection unit 23 detects a pedestrian, which is a target object present outside an illumination range of a low beam of the vehicle 100. That is, the first detection unit 23 detects a pedestrian present in the distance ahead of the vehicle 100 out of the reach of the low beam and thus not visually recognizable by a driver, using the far-infrared camera 31. The distance out of the reach of the low beam is, for example, a range 40 meters or more away from the vehicle 100. The first detection unit 23 here detects a pedestrian in a range within 120 meters from vehicle 100.

Specifically, the far-infrared camera 31 is a camera that can capture a heat source as video. The far-infrared camera 31 senses a temperature distribution with a sensor and outputs the temperature distribution as video data.

The first detection unit 23 takes as input the video data output by the far-infrared camera 31, and performs camera signal processing such as gradation processing, using a circuit such as an application specific integrated circuit (ASIC) or a field-programmable gate array (FPGA). From one still image, the first detection unit 23 calculates features in the image, using a system on a chip (SoC) for automobile preventive safety, and applies a support vector machine on the features to determine whether a pedestrian is present. Then, the first detection unit 23 calculates the locations of pixels determined as the pedestrian in the still image, and outputs the top-left pixel location 53 (Utl, Vtl) and the bottom-right pixel location 54 (Ubr, Vbr) of the detection frame 52 in the image coordinate system 50.

Note that a method for detecting a pedestrian may be any method. Specifically, a method for extracting features and a method for determining the presence of a pedestrian based on the features may be any methods. The pixel locations that are output may be other locations such as the center coordinates 55 of the pedestrian, instead of the top-left pixel location 53 and the bottom-right pixel location 54.

(Step S2: Pixel base prediction process)

The pixel base prediction unit 41 of the light control unit 22 predicts the pixel locations of a destination of the pedestrian at a time after a certain time period, based on the pixel locations output in step 51. The pixel base prediction unit 41 here calculates the pixel locations {(lu(t+p|t), lv(t+p|t)), p=1, . . . , 50} of destinations of the pedestrian at times after 0.1 [s] to 5 [s], using a Kalman filter.

Specifically, the pixel base prediction unit 41 calculates the center coordinates 55 ((Utl+Ubr)/2, (Vtl+Vbr)/2) based on the top-left pixel location 53 (Utl, Vtl) and the bottom-right pixel location 54 (Ubr, Vbr) of the detection frame 52. The pixel base prediction unit 41 takes as input the center coordinates 55, and calculates horizontal destinations of the pedestrian at times after 0.1[s] to 5 [s], using the Kalman filter.

Note that a method for calculating the pixel locations of the destinations is not limited to a method using the Kalman filter and may be other methods.

A method for predicting a pixel location using the Kalman filter will be described.

A location is represented as "l", a velocity is represented as "v", and an acceleration is represented as "a". The location on an image, velocity, and acceleration at a time t are the location (lu(t), lv(t)), velocity (vu(t)), vv(t)), and acceleration (au(t), av(t)), respectively. A state vector x(t) is defined by x(t)=[lu(t), lv(t), vu(t), vv(t), au(t), av(t)].

A state space model is x(t+1)=Fx(t)+Gξ(t), where F is a state transition matrix, G is a transition matrix of system noise, and ξ(t) is normal white noise with mean 0 and covariance Q. An observation model of the pixel locations of the detected pedestrian is y(t)=Hx(t)+η(t), where H is an observation matrix and η(t) is normal white noise with mean 0 and covariance R.

By giving initial values of x(1|0)=x0 and P(1|0)=P0, the following prediction estimate values and filtering estimate values are determined for t=1, . . . , N. Note that a mean value that x(t) can take is estimated and given as x0, and a covariance value that x(t) can take is estimated and given as P0.

$$K(t)=P(t|t-1)H^{\{T\}}\{HP(t|t-1)H^{\{T\}}+R\}^{\{-1\}}$$

$$x(t|t)=x(t|t-1)+K(t)\{y(t)-Hx(t|t-1)\}$$

$$P(t|t)=P(t|t-1)-KHP(t|t-1)$$

$$x(t+1|t)=Fx(t|t)$$

$$P(t+1|t)=FP(t|t)F^{\{T\}}+GQG^{\{T\}}$$

In the equations, "^" represents exponentiation. For example, X^Y represents $X^Y$. However, X^{T} represents the transpose of a matrix X.

F is the matrix of 6×6, and is modeled on the assumption that the pixel locations of the detected pedestrian move linearly with constant acceleration and defined as F=[1 0 Δt 0 ((Δt)^{2})/2 0; 0 1 0 ((Δt)^{2})/2; 0 0 1 0 Δt 0; 0 0 0 0 1 Δt; 0 0 0 0 1 0; 0 0 0 0 0 1]. In the matrix, ";" represents a line break.

It is assumed for system noise that the elements of the state vector are not correlated with one another, and G is defined as an identity matrix of 6×6.

The pixel base prediction unit 41 outputs only the pixel location ((Utl+Ubr)/2, (Vtl+Vbr)/2) of the pedestrian. Therefore, the observation matrix H is defined as H=[1 0 0 0 0 0; 0 1 0 0 0 0; 0 0 0 0 0 0; 0 0 0 0 0 0; 0 0 0 0 0 0; 0 0 0 0 0 0].

When the output from the detection unit 21 has a period of 0.1 [s], Δt=0.1 [s] is given and concrete values of the matrix F are determined.

Separately from the Kalman filter, the relationship x(t+p|t)=F^{p}×(t|t) is determined. Based on Δt=0.1 [s], times after 0.1 [s], 0.2 [s], . . . , 5 [s] correspond to p=1, 2, . . . , 50. Therefore, by using the above formula, the state vector can be predicted for every 0.1 [s] until 5 seconds later.

Then, based on state vectors x(t+1|t), . . . , (t+50|t) at times after 0.1 [s] to 5 [s], horizontal pixel locations lu(t+1|t), . . . , lu(t+50|t) at times after 0.1 [s] to 5 [s] can be calculated.

(Step S3: First Illumination Process)

The first angle calculation unit 42 of the light control unit 22 calculates a horizontal angle θ(t+p|t) of a direction in which the pedestrian is present with respect to the traveling direction of the vehicle 100. Then, the control execution unit 48 controls the marking light 35 based on the calculated horizontal angle θ(t+p|t) to emit light in the direction in which the pedestrian is present.

The marking light 35 is a light that can illuminate a narrower range over a longer distance when compared with the low beam, and allows the illumination direction to be changed. The vehicle 100 may be provided with not only one marking light 35 but also a plurality of marking lights 35. When a plurality of marking lights 35 are provided, the luminance, color, illumination direction, or the like of each marking light may be allowed to be controlled separately. The marking light 35 here is an LED as an example, and the illumination direction of light is changed by the horizontal stepping motor 39 and the vertical stepping motor 40.

Specifically, the first angle calculation unit 42 takes as input the pixel locations (lu(t+1|t), lv(t+1|t), . . . ,(lu(t+50|t)), lv(t+50|t)) of the horizontal destinations of the pedestrian at times after 0.1 [s] to 5[s] calculated in step S2, and calculates horizontal angles θ(t+1 |t), . . . , θ(t−50 |t) of the marking light 35 in the light coordinate system 70 at times after 0.1 [s] to 5 [s]. The first angle calculation unit 42 outputs the horizontal angles θ(t+1 |t), . . . , θ(t+50 |t) at times after 0.1 [s] to 5 [s] to the light control unit 22.

The first angle calculation unit 42 determines, in advance, a relationship (linear equation) of the horizontal angles of the marking light 35 with respect to the horizontal pixel locations of an image obtained by the far-infrared camera 31, and stores the relationship as a calibration parameter in the first parameter storage unit 421. The first angle calculation unit 42 calculates the horizontal angles of the marking light 35 corresponding to the horizontal pixel locations based on this calibration parameter.

Figure 7:
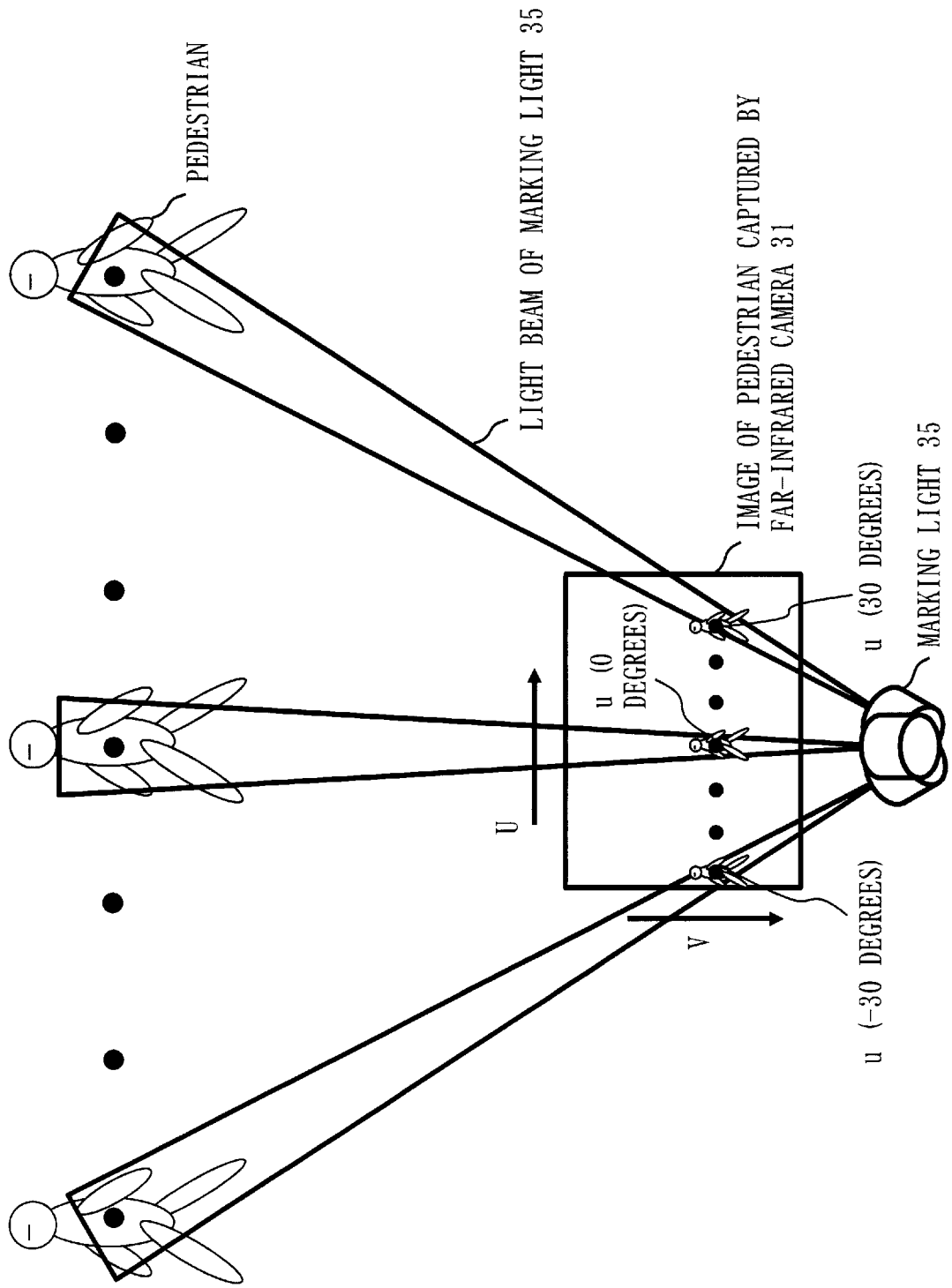
FIG. 7 is a diagram illustrating a relationship between an image obtained by the far-infrared camera 31 and horizontal angles of a marking light 35 according to the first embodiment.

The calibration parameter will be described. For example, as illustrated in FIG. 7, the first angle calculation unit 42 measures, in advance, horizontal locations u (−30 degrees), u (−20 degrees), u (−10 degrees), u (0 degrees), u (10 degrees), u (20 degrees), and u (30 degrees) in the image coordinates of the far-infrared camera 31 corresponding to horizontal angles−30 degrees, −20 degrees, −10 degrees, 0 degrees, 10 degrees, 20 degrees, and 30 degrees of the marking light 35, and stores them as a table in the first parameter storage unit 421. This table is the calibration parameter. The first angle calculation unit 42 determines into which section of the table the center coordinates 55 ((Utl+Ubr)/2, (Vtl+Vbr)/2) calculated based on the pixel location (lu(t+p|t), lv(t+p|t)) fall. Then, the first angle calculation unit 42 determines the angle corresponding to the center coordinates 55 ((Utl+Ubr)/2, (Vtl+Vbr)/2) in that section as the horizontal angle of the marking light 35, using the linear equation.

Note that there may be a case in which the relationship of the horizontal angles of the marking light 35 with respect to the horizontal pixel locations of an image obtained by the far-infrared camera 31 is not linear. In this case, the horizontal angles of the marking light 35 can be calculated with high accuracy by generating a table with many sampling points. Sampling points may be approximated by a polynomial, and the horizontal angles of the marking light 35 may be calculated based on the polynomial.

The control execution unit 48 selects one of the 50 horizontal angles at times after 0.1 to 5 seconds, taking into consideration the processing time from the calculation of the horizontal angles to the emission of light from the marking light 35 to the pedestrian. The control execution unit 48 outputs to the horizontal driver 37 a motor control signal to cause the marking light 35 to be rotated at the selected horizontal angle. The motor control signal is a signal that indicates a rotation direction and a pulse width. The control execution unit 48 also outputs a driver control signal to the LED driver 34.

When the motor control signal is input, the horizontal driver 37 outputs a pulse signal to the horizontal stepping motor 39 based on the motor control signal. The horizontal stepping motor 39 rotates the marking light 35 in the horizontal direction based on the pulse signal. When the driver control signal is input, the LED driver 34 applies a 5 V voltage to the marking light 35. When the 5 V voltage is applied, the marking light 35 lights up.

That is, the marking light 35 emits light at the selected horizontal angle in the direction in which the pedestrian is present.

(Step S4: Second Detection Process)

The second detection unit 24 detects the pedestrian, which is the target object present in the range illuminated by the marking light 35, using the visible-light camera 32. That is, emitting light to the pedestrian by the marking light 35 in step S3 allows the pedestrian to be imaged by the visible-light camera 32. Thus, the second detection unit 24 images the range illuminated by the marking light 35, using the visible-light camera 32, and detects the pedestrian.

Specifically, the visible-light camera 32 outputs video data obtained by imaging the range illuminated by the marking light 35. At this time, the visible-light camera 32 performs imaging after adjusting the exposure time and correcting the gradation by camera signal processing hardware mounted on a built-in ASIC or FPGA.

The second detection unit 24 takes as input the video data output by the visible-light camera 32 and calculates, from one still image, features in the image, using the SoC for automobile preventive safety, and then applies the support vector machine on the features to determine whether a pedestrian is present. The second detection unit 24 calculates the locations of pixels determined as the pedestrian in the still image to identify the top-left pixel location 53 (Utl, Vtl) and the bottom-right pixel location 54 (Ubr, Vbr) of the detection frame 52 in the image coordinate system 50. The second detection unit 24 calculates the center coordinates 55 based on the top-left pixel location 53 (Utl, Vtl) and the bottom-right pixel location 54 (Ubr, Vbr). Based on the center coordinates 55, the second detection unit 24 calculates and outputs the coordinate values (xwp(t), ywp(t), zwp(t)) of the pedestrian in the vehicle coordinate system 60 with the location of the vehicle 100 at the given time T=t as the origin.

Note that a method for detecting a pedestrian may be any method as in step S1.

(Step S5A: Vehicle Base Prediction Process)

The vehicle base prediction unit 43 of the light control unit 22 predicts the coordinate values of the destination of the pedestrian at a time after a certain time period based on the coordinate values of the pedestrian output in step S4. The vehicle base prediction unit 43 here calculates the coordinates $\{(xwp(t+p|t), ywp(t+p|t), zwp(t+p|t)), p=1, \ldots, 50\}$ of the destinations of the pedestrian in the vehicle coordinate system 60 at times after 0.1 [s] to 5 [s] with respect to the given time t, using the Kalman filter.

A method for predicting the coordinates using the Kalman filter can be obtained with substantially the same algorithm as that of the method for predicting the pixel locations using the Kalman in step S2. State vectors may be defined with a physical model taken into consideration.

(Step S5B: Vehicle Movement Prediction Pocess)

The vehicle movement prediction unit 45 of the light control unit 22 obtains a traveling velocity V(t) [m/s], a yaw rate (yaw angular velocity) r(t) [°/s], and a steering angle δ(t) [°] of the vehicle 100 at the given time t from the in-vehicle sensors 33. The in-vehicle sensors 33 are various types of sensors mounted on the vehicle 100. The vehicle movement prediction unit 45 takes as input the traveling velocity V(t), the yaw rate r(t), and the steering angle δ(t), and calculates a turning radius $\rho(t)=(1-m/(2 \cdot 1\hat{\ }(2)) \cdot ((1f \cdot Kf-1r \cdot Kr)/Kf \cdot Kr)(V(t)\hat{\ }(2))) \cdot 1/\delta(t)$.

Note that m [kg] is inertial mass, l [m] is a wheel base length, Kf is the cornering force of a front wheel, Kr is the cornering force of a rear wheel, lf [m] is the distance between the center of gravity of the vehicle and a front axle, and lr [m] is the distance between the center of gravity of the vehicle and a rear axle and is a constant for calculating the turning radius when predicting the movement of the vehicle 100.

The vehicle movement prediction unit 45 calculates a length L(t, t+p)=V(t)×0.1 [s]×p of an arc along the radius ρ(t) for p=1, . . . , 50 with respect to the given time t. As a result, the vehicle movement prediction unit 45 obtains, as predicted values, a trajectory of the locations of the vehicle along the turning radius ρ(t) at times until 5 seconds later.

The vehicle movement prediction unit 45 calculates tuning angles (t, t+p)=(360[°]×L(t, t+p))/(2×π×ρ(t)) at these times. Then, the vehicle movement prediction unit 45 calculates predicted movement locations (xwc(t, t+p), zwc(t, t+p)) in the vehicle coordinate system 60 at the time t, for p=1, . . . , 50, by xwc(t, t+p)=−ρ(t)+ρ(t)cos(104 (t, t+p)) and zwc(t, t+p)=ρ(t)sin(ψ(t, t+p)) when the yaw rate r(t) is positive, and by xwc(t, t+p)=ρ(t)−ρp(t)cos(ψ(t, t+p)) and zwc(t, t+p)=ρ(t)sin(ψ(t, t+p)) when the yaw rate r(t) is negative.

It is assumed here that the height of the vehicle 100 from the road is fixed and ywc is output as a constant.

Note that the vehicle movement prediction unit 45 may calculate the predicted values with respect to the time t, considering that the vehicle 100 moves up and down due to suspension in accordance with the ups and downs of the road or the like. In this case, the vehicle movement prediction unit 45 may calculate and output ywc(t, t+p). However, this involves the introduction of a physical model of suspension for prediction, which is complicated, so that the fixed value is used here.

(Step S5C: Low Beam Determination Process)

The low beam detection unit 46 of the light control unit 22 determines whether the pedestrian has entered the illumination range of the low beam.

Figure 8:
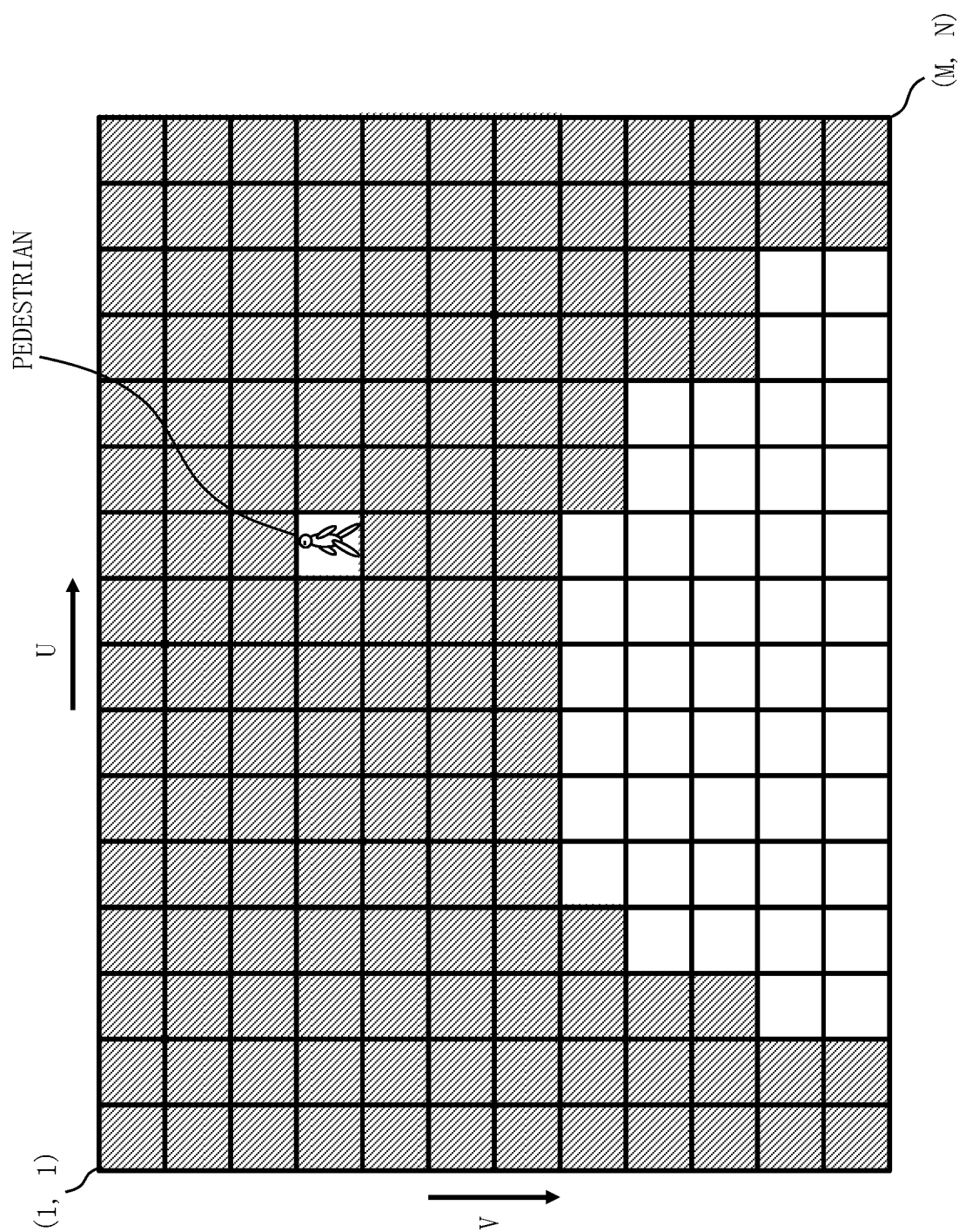
FIG. 8 is a diagram describing a low beam determination process according to the first embodiment.

Specifically, the low beam detection unit 46 obtains video data obtained by imaging the area in front of the vehicle 100 by the visible-light camera 32. As illustrated in FIG. 8, the low beam detection unit 46 divides image data at the given time t out of the video data into a plurality of blocks. For example, the low beam detection unit 46 divides the image data into blocks of 40 pixels×40 pixels. The low beam detection unit 46 calculates, for each block, the average value of luminance values of pixels included in that block as the block average.

Then, the low beam detection unit 46 identifies a block containing pixels corresponding to the location of the pedestrian detected in step S4 that has been performed most recently. The low beam detection unit 46 determines whether the block average of the identified block is higher than a threshold value. The low beam detection unit 46 also determines whether the block averages of all the blocks surrounding the identified block are lower than the threshold value. If the block average of the identified block is higher than the threshold value and the block averages of all the blocks surrounding the identified block are not lower than the threshold value, the low beam detection unit 46 determines that the pedestrian has entered the illumination range of the low beam.

(Step S6A: Angle Calculation Process)

The second angle calculation unit 44 of the light control unit 22 converts the 50 sets of the coordinates (xwp(t, t+p), ywp(t, t+p), zwp(t, t+p)) of the pedestrian in the vehicle coordinate system 60 at times after 0.1 to 5 seconds and the 50 sets of the coordinates (xwc(t, t+p), ywc(t, t+p), zwc(t, t+p)) of the vehicle 100 in the vehicle coordinate system 60 at times after 0.1 to 5 seconds into coordinates in the light coordinate system 70.

The second angle calculation unit 44 measures, in advance, calibration parameters for conversion between the coordinates (xwp(t+p|t), ywp(t+p|t), zwp(t+p|t)) of the pedestrian in the vehicle coordinate system 60 and the coordinates (xlp(t+p|t), ylp(t+p|t), zlp(t+p|t)) of the pedestrian in the light coordinates, and stores the calibration parameters in the second parameter storage unit 441. The calibration parameters are rotation (r11, r12, r13, r21, r22, r23, r31, r32, r33) and translation (t1, t2, t3) between the two coordinate systems.

The second angle calculation unit 44 can convert the coordinates of the pedestrian in the vehicle coordinate system 60 into the coordinates of the pedestrian in the light coordinates by calculating [xlp(t+p|t); ylp(t+p|t); zlp(t+p|t); 1]=[r11 r12 r13 t1; r21 r22 r23 t2; r31 r32 r33 t3; 0 0 0 1]×[xwp(t+p|t); ywp(t+p|t); zwp(t+p|t); 1].

The second angle calculation unit 44 likewise converts the coordinates (xwc(t+p|t), ywc(t+p|t), zwc(t+p|t)) of the vehicle 100 in the vehicle coordinate system 60 into the coordinates (xlc(t+p|t), ylc(t+p|t), zlc(t+p|t)) of the vehicle 100 in the light coordinates.

The second angle calculation unit 44 calculates a horizontal angle θ and a vertical angle φ based on the coordinates (xlp(t+p|t), ylp(t+p|t), zlp(t+p|t)) of the pedestrian in the light coordinate system 70 and the coordinates (xlc(t+p|t), ylc(t+p|t), zlc(t+p|t)) of the vehicle 100 in the light coordinate system 70. Specifically, the second angle calculation unit 44 calculates the horizontal angle θ by θ(t+p, t)=atan({xlp(t+p|t)−xlc(t+p|t)}/{zlp(t+p|t)−zlc(t+p|t)}). The second angle calculation unit 44 calculates the vertical angle φ by φ(t+p, t)=atan({ylp(t+p|t)−ylc(t+p|t)}/{zlp(t+p|t)−zlc(t+p|t)}).

Note that θ(t+p, t) indicates the horizontal angle at a time after a time period p from the time t, and φ(t+p, t) indicates the vertical angle at the time after the time period p from the time t.

(Step S6B: Collision Location Prediction Process)

The collision prediction unit 47 determines whether the pedestrian and the vehicle 100 are predicted to move to the same location at the same time based on the predicted location of the pedestrian calculated in step S5A and the predicted location of the vehicle 100 calculated in step S5B. The same time is not limited to exactly the same time, but also includes a certain width of time such as one second, for example. Similarly, the same location is not limited to exactly the same location, but also includes a range with a certain space such as 3 meters square. If it is determined that the pedestrian and the vehicle 100 are predicted to move to the same location at the same time, the collision prediction unit 47 determines that there is a probability that the pedestrian and the vehicle 100 will collide.

Then, the collision prediction unit 47 identifies the same location described above as a collision location where the pedestrian and the vehicle 100 will collide. The second angle calculation unit 44 calculates the horizontal angles θ and the vertical angles φ of the collision location with respect to the traveling direction of the vehicle 100 at times after 0.1 to 5 seconds. The method for calculating the horizontal angles θ and the vertical angles φ is the same as that in step S6A.

(Step S7: Second Illumination Process)

The control execution unit 48 controls the marking light 35 based on the horizontal angles θ and the vertical angles φ calculated in step S6A, the result of determination in step S6B, and the result of determination in step S5C. The control execution unit 48 changes control depending on whether it is determined that there is a probability of collision or it is determined that there is no probability of collision in step S6B.

The control when it is determined that there is a probability of collision will be described.

The control execution unit 48 controls the marking light 35 to emit light in the direction toward the collision location and in the direction in which the pedestrian is present. At this time, the control execution unit 48 changes the light emitted from the marking light 35 according to a certain pattern. After a certain period of time, the control execution unit 48 controls the marking light 35 to emit light only in the direction in which the pedestrian is present.

Specifically, the control execution unit 48 selects one of the 50 pairs of the horizontal angle θ and the vertical angle φ at times after 0.1 to 5 seconds, for each of the collision location and the location of the pedestrian. At this time, the control execution unit 48 selects a pair of the horizontal angle θ and the vertical angle φ, taking into consideration the processing time from the execution of step S7 to the emission of light from the marking light 35. The control execution unit 48 outputs to the horizontal driver 37 a motor control signal to cause the marking light 35 to be rotated at the horizontal angle θ of the selected pair, and outputs to the vertical driver 38 a motor control signal to cause the marking light 35 to be rotated at the vertical angle φ of the selected pair, with respect to each of the collision location and the location of the pedestrian. The control execution unit 48 also outputs a driver control signal to the LED driver 34.

When the motor control signal is input, the horizontal driver 37 outputs a pulse signal to the horizontal stepping motor 39 based on the motor control signal. The horizontal stepping motor 39 rotates the marking light 35 in the horizontal direction based on the pulse signal. Similarly, when the motor control signal is input, the vertical driver 38 outputs a pulse signal to the vertical stepping motor 40 based on the motor control signal. The vertical stepping motor 40 rotates the marking light 35 in the vertical direction based on the pulse signal. At this time, the horizontal stepping motor 39 and the vertical stepping motor 40 rotate some light sources of the marking light 35 in the direction of the collision location and rotate the remaining light sources in the direction of the pedestrian. When the driver control signal is input, the LED driver 34 applies a 5 V voltage to the marking light 35.

After a certain period of time has elapsed, the control execution unit 48 selects one of the pairs of the horizontal angle θ and the vertical angle φ only with respect to the collision location, and then controls the marking light 35 to emit light only in the direction in which the pedestrian is present.

Until a certain period of time elapses, the control execution unit 48 may drive the LED driver 34 to cause the marking light 35 to emit light so as to scan from the vehicle 100 to the collision location. Until a certain period of time elapses, the control execution unit 48 may cause the marking light 35 to emit light to the collision location such that the color of the light gradually changes, for example, from blue to read. Until a certain period of time elapses, the control execution unit 48 may cause the marking light 35 to emit light to the collision location such that the intensity of the light gradually changes.

The control when it is determined that there is no probability of collision will be described.

The control execution unit 48 controls the marking light 35 to emit light in the direction in which the pedestrian is present, and stops the emission of light when the pedestrian has entered the illumination range of the low beam. When light is emitted, the control execution unit 48 may change the light emitted from the marking light 35 according to a certain pattern.

Specifically, the control execution unit 48 selects one of the 50 pairs of the horizontal angle θ and the vertical angle φ at times after 0.1 to 5 seconds, for the location of the pedestrian. At this time, the control execution unit 48 selects a pair of the horizontal angle θ and the vertical angle φ, taking into consideration the processing time from the execution of step S7 to the emission of light from the marking light 35. The control execution unit 48 outputs to the horizontal driver 37 a motor control signal to cause the marking light 35 to be rotated at the horizontal angle θ of the selected pair, and outputs to the vertical driver 38 a motor control signal to cause the marking light 35 to be rotated at the vertical angle φ of the selected pair. The control execution unit 48 also outputs a driver control signal to the LED driver 34.

When the motor control signal is input, the horizontal driver 37 outputs a pulse signal to the horizontal stepping motor 39 based on the motor control signal. The horizontal stepping motor 39 rotates the marking light 35 in the horizontal direction based on the pulse signal. Similarly, when the motor control signal is input, the vertical driver 38 outputs a pulse signal to the vertical stepping motor 40 based on the motor control signal. The vertical stepping motor 40 rotates the marking light 35 in the vertical direction based on the pulse signal. When the driver control signal is input, the LED driver 34 applies a 5 V voltage to the marking light 35.

When it is determined in step SSC that the pedestrian has entered the illumination range of the low beam, the control execution unit 48 outputs to the LED driver 34 a driver control signal indicating that the emission of light is to be stopped. When the driver control signal is input, the LED driver 34 applies a 0 V voltage to the marking light 35. This stops the emission of light from the marking light 35.

In step S7, until it is determined in step SSC that the pedestrian has entered the illumination range of the low beam, the control execution unit 48 may drive the LED driver 34 to cause the marking light 35 to emit light of a color temperature depending on the distance from the vehicle 100 to the pedestrian. The control execution unit 48 may change the color of the light gradually from blue to read as the distance becomes shorter. The control execution unit 48 may cause the marking light 35 to emit light with an intensity depending on the distance.

The distance from the vehicle 100 to the pedestrian can be calculated based on the location of the vehicle 100 and the location of the pedestrian. At this time, the distance may be calculated using the location of the vehicle 100 and the location of the pedestrian in the vehicle coordinate system 60, or the distance may be calculated using the location of the vehicle 100 and the location of the pedestrian in the light coordinate system 70.

Figure 9:
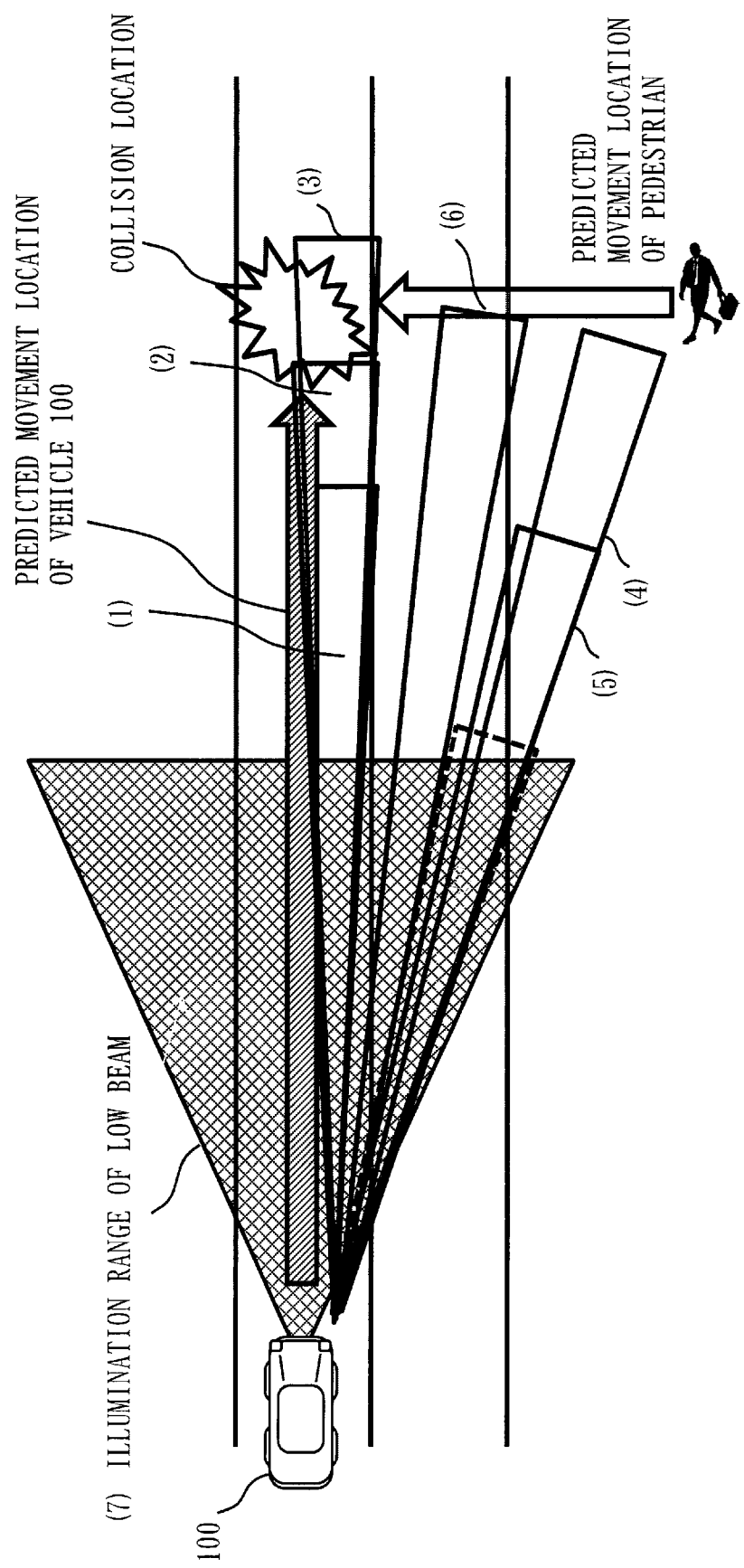
FIG. 9 is a diagram illustrating an example of control of the marking light 35 according to the first embodiment.

For example, as illustrated in FIG. 9, the control execution unit 48 causes the marking light 35 to emit light in the order of (1), (2), and (3) so as to scan from the vehicle 100 to the collision location. At the same time, the control execution unit 48 causes the marking light 35 to emit light to the range in which the pedestrian is present as indicated by (4) and (5). When the pedestrian moves as indicated by (6), the control execution unit 48 causes the marking light 35 to emit light to the location to which the pedestrian has moved. When the pedestrian has entered the illumination range of the low beam indicated by (7), the control execution unit 48 stops the emission of light.

Effects of First Embodiment

As described above, the vehicle lighting control apparatus 10 according to the first embodiment detects a pedestrian present outside the illumination range of the low beam, and emits light to the range in which the pedestrian is present by the marking light 35. This allows the driver to recognize a target object in the distance that cannot be recognized in a situation where only the low beam is used.

The pedestrian can be reassured that the driver is aware of the existence of the pedestrian by being illuminated with light by the marking light 35.

When the pedestrian has entered the illumination range of the low beam, the vehicle lighting control apparatus 10 according to the first embodiment stops the emission of light by the marking light 35. This can prevent the driver from paying attention to the light from the marking light 35 and diminishing attention to the pedestrian. It is also possible to reduce the consumption of energy required for emitting light and driving the horizontal stepping motor 39 and the vertical stepping motor 40.

The vehicle lighting control apparatus 10 according to the first embodiment detects a pedestrian present in the range illuminated by the marking light 35, using the visible-light camera 32. By detecting the pedestrian with the visible-light camera 32, the location where the pedestrian is present can be identified not only in the horizontal direction but also in the vertical direction. This allows light to be emitted to the pedestrian with higher accuracy.

Control such as emitting light to a location lower than the face of the pedestrian may also be considered. This can prevent the pedestrian from being dazzled.

The vehicle lighting control apparatus 10 according to the first embodiment changes at least one of the color of light emitted by the marking light 35 and the intensity of light emitted by the marking light 35, depending on the distance between the vehicle 100 and the pedestrian. This allows the driver to easily recognize the distance from the vehicle 100 to the pedestrian.

The vehicle lighting control apparatus 10 according to the first embodiment predicts a collision location, and emits light to the collision location by the marking light 35. This allows the driver and the pedestrian to be alerted.

Other Configurations

First Variation

In the first embodiment, when the pedestrian has entered the illumination range of the low beam, the control execution unit 48 stops the emission of light by the marking light 35. However, when the pedestrian has entered the illumination range of the low beam, the control execution unit 48 may reduce the intensity of the light from the marking light 35. This prevents the driver from being confused by the light from the marking light 35, and can facilitate the recognition of the location where the pedestrian is present by the driver.

Second Variation

In the first embodiment, the hardware of the horizontal driver 37 and the vertical driver 38 is used to control the direction of the marking light 35. However, the control execution unit 48 may control the direction of the marking light 35 by software.

Second Embodiment

A second embodiment differs from the first embodiment in that a ranging sensor 321 such as a laser scanner is used in place of the visible-light camera 32. In the second embodiment, this difference will be described, and description of the same portions will be omitted.

Description of Configuration

Figure 10:
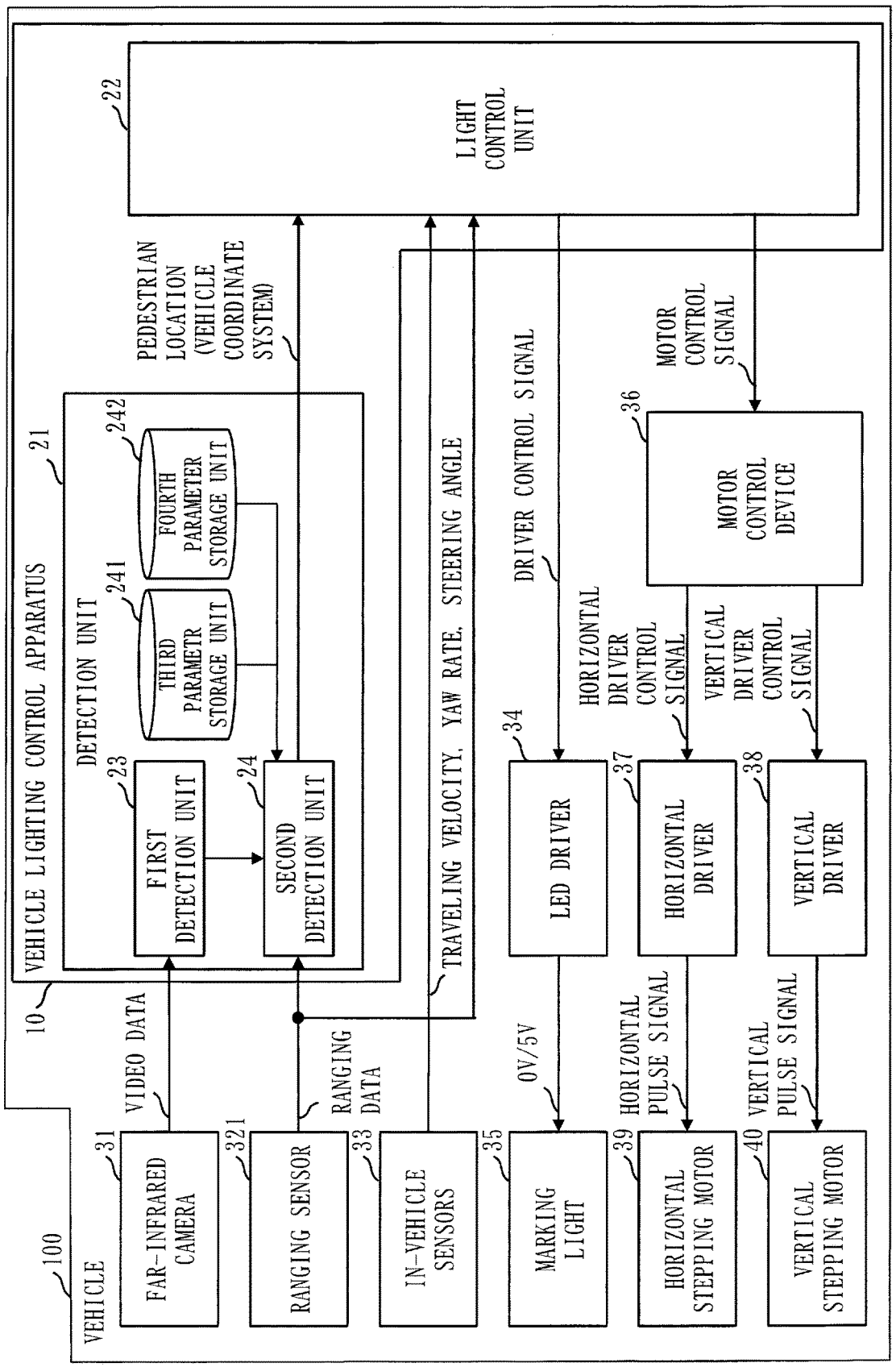
FIG. 10 is a configuration diagram of the vehicle lighting control apparatus 10 according to a second embodiment.

Referring to FIG. 10, a configuration of the vehicle lighting control apparatus 10 according to the second embodiment will be described.

Differences from the configuration illustrated in FIG. 1 are that the ranging sensor 321 is mounted on the vehicle 100 in place of the visible-light camera 32, and that the detection unit 21 includes a third parameter storage unit 241 and a fourth parameter storage unit 242.

The ranging sensor 321 is a sensor that measures a distance using a laser and outputs ranging data. A specific example of the ranging sensor 321 is a laser scanner such as a LiDAR (Light Detection and Ranging). In the second embodiment, it is assumed that the ranging sensor 321 emits a laser to the area around the vehicle 100, receives light reflected at a reflection point to calculate the distance to the reflection point, and outputs ranging data indicating the calculated distance to the reflection point.

Figure 11:
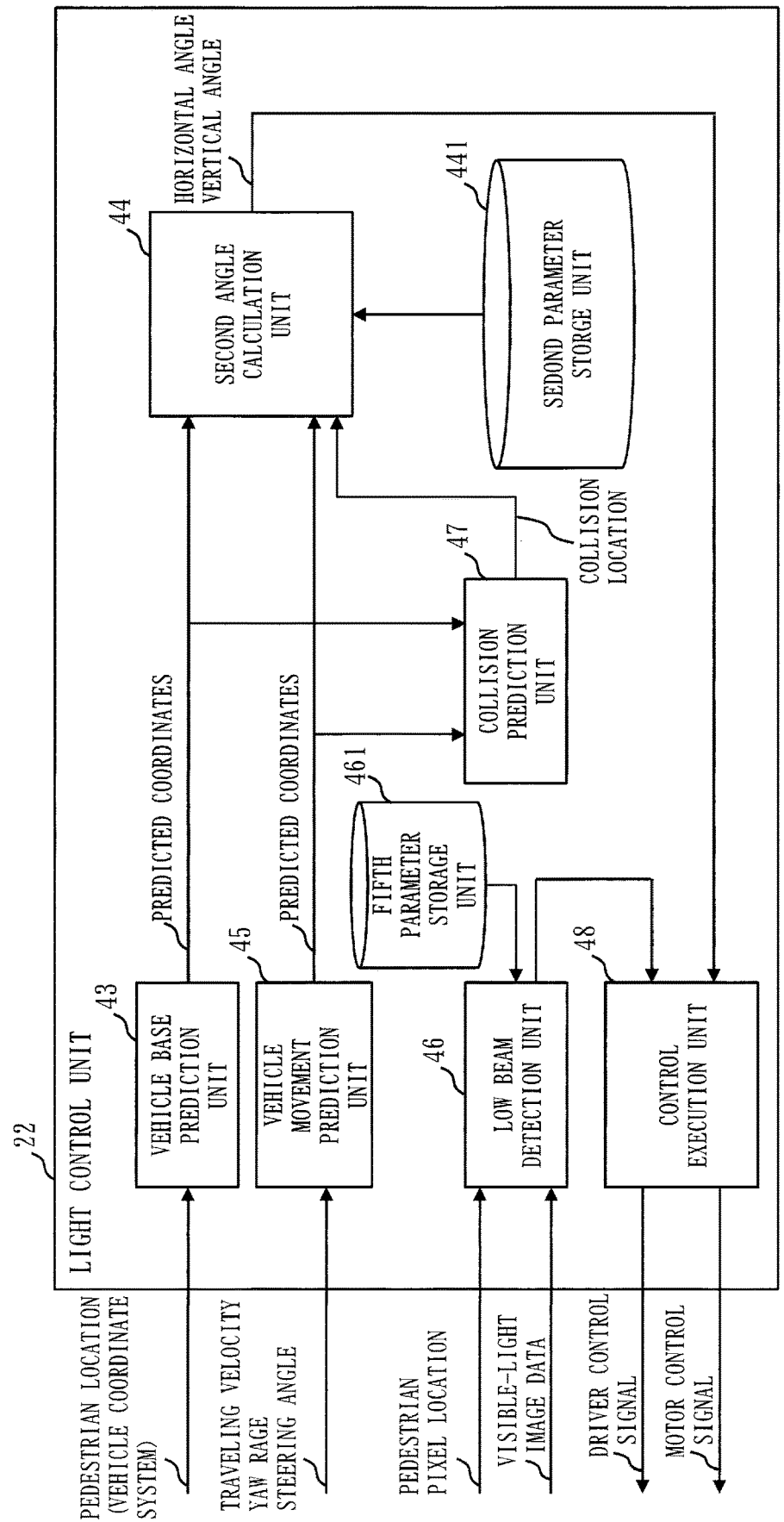
FIG. 11 is a configuration diagram of the light control unit 22 according to the second embodiment.

Referring to FIG. 11, a configuration of the light control unit 22 according to the second embodiment will be described.

The light control unit 22 differs from the configuration illustrated in FIG. 2 in that the pixel base prediction unit 41, the first angle calculation unit 42, and the first parameter storage unit 421 are not included and a fifth parameter storage unit 461 is included.

Description of Operation

Referring to FIGS. 12 to 15, operation of the vehicle lighting control apparatus 10 according to the second embodiment will be described.

The operation of the vehicle lighting control apparatus 10 according to the second embodiment corresponds to a vehicle lighting control method according to the second embodiment. The operation of the vehicle lighting control apparatus 10 according to the second embodiment also corresponds to processes of a vehicle lighting control program according to the second embodiment.

Figure 12:
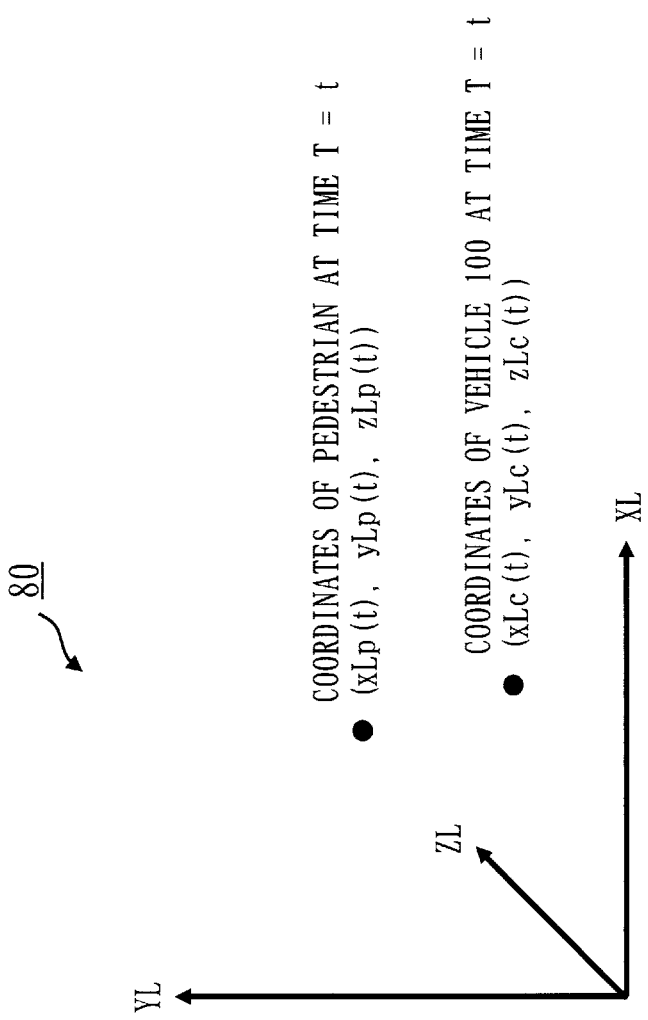
FIG. 12 is a diagram illustrating a ranging sensor coordinate system 80 according to the second embodiment.

Referring to FIG. 12, mathematical definitions according to the second embodiment will be described.

As illustrated in FIG. 12, a ranging sensor coordinate system 80 is such that an illumination direction of a laser at 0 degrees is a ZL axis, and an XL axis and a YL axis are defined using the left-handed system. The coordinates of a pedestrian in the ranging sensor coordinate system 80 at a given time T=t are represented as (xLp(t), yLp(t), zLp(t)). The coordinates of the vehicle 100 in the ranging sensor coordinate system 80 at the given tim T=t are represented as (xLc(t), wLc(t), zLc(t)).

Figure 13:
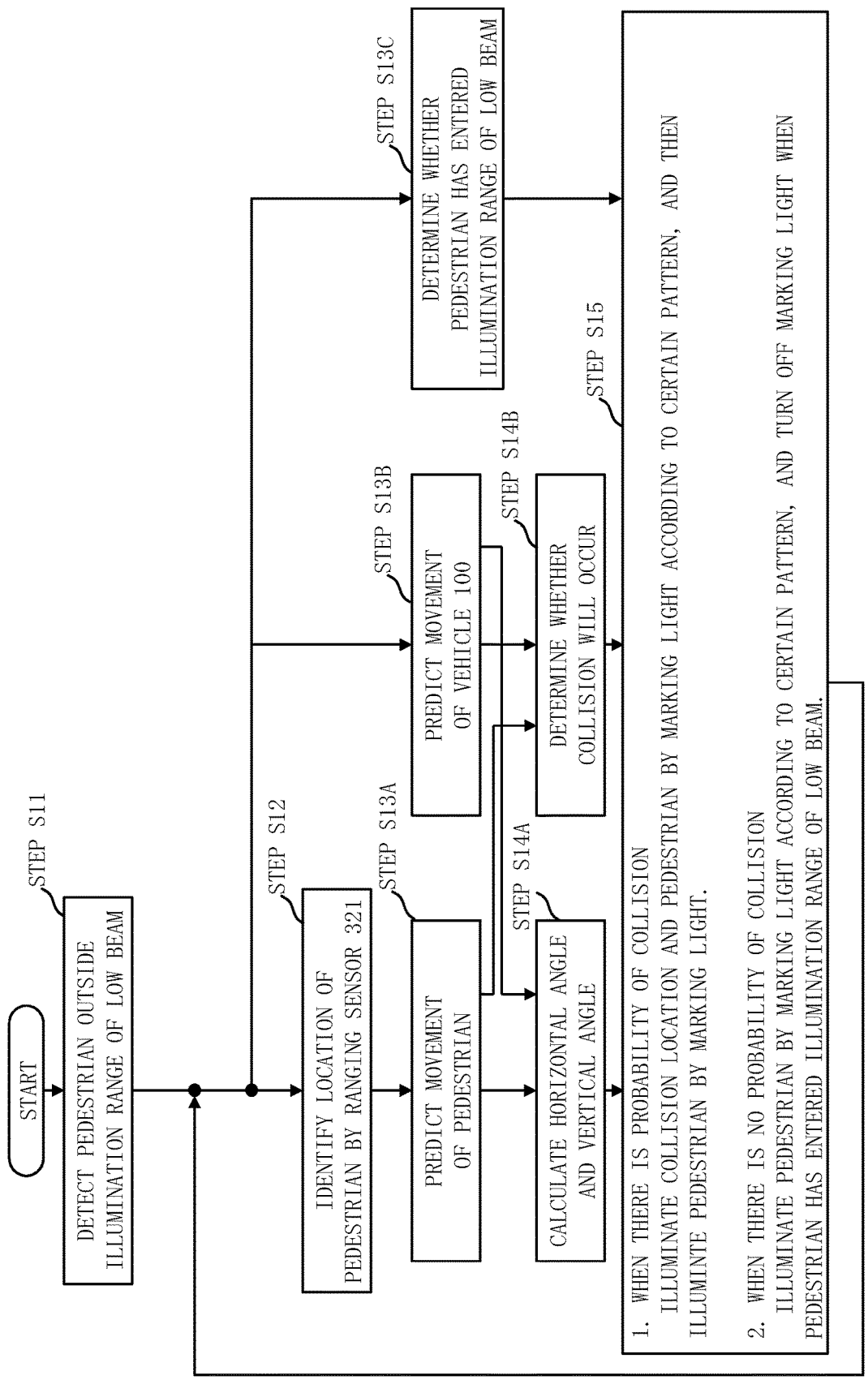
FIG. 13 is a flowchart illustrating operation of the vehicle lighting control apparatus 10 according to the second embodiment.

Referring to FIG. 13, the operation of the vehicle lighting control apparatus 10 according to the second embodiment will be described.

The process of step S11 is the same as the process of step S1 in FIG. 6. Step S13B is the same as step S5B in FIG. 6. Steps S14A and S14B are the same as steps S6A and S6B in FIG. 6.

(Step S12: Second detection process)

The second detection unit 24 measures the distance to the pedestrian, which is the target object present outside the illumination range of the low beam of the vehicle 100, based on ranging data output from the ranging sensor 321.

Figure 14:
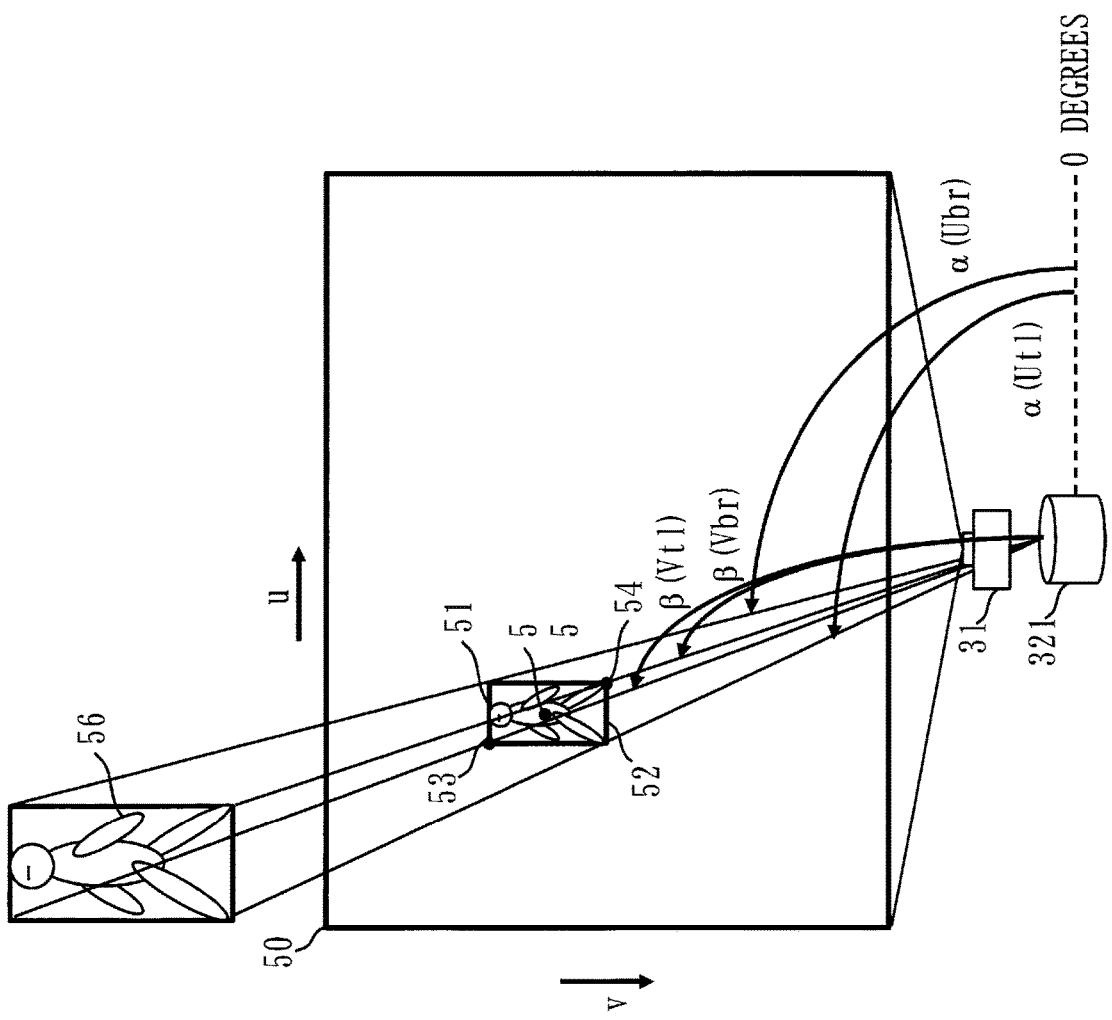
FIG. 14 is a diagram illustrating a relationship between pixel locations of a pedestrian in the image coordinate system 50 and locations in the ranging sensor coordinate system 80 according to the second embodiment.

Specifically, the second detection unit 24 first converts the pixel locations of the pedestrian in the image coordinate system 50 output in step S1 into locations in the ranging sensor coordinate system 80. That is, as illustrated in FIG. 14, the second detection unit 24 converts a top-left pixel location 53 (Utl, Vtl) of a detection frame 52 of a pedestrian 56 in the image coordinate system 50 into a horizontal angle α(Utl) and a vertical angle β(Vtl) of the ranging sensor 321, and converts a bottom-right pixel location 54 (Ubr, Vbr) into a horizontal angle α(Ubr) and a vertical angle β(Vbr) of the ranging sensor 321.

The second detection unit 24 has stored in the third parameter storage unit 241 illumination directions (α(u, v), β(u, v)) of the ranging sensor 321 corresponding to any predetermined coordinates (u, v) in the image coordinate system 50 of the far-infrared camera 31 as a table. The second detection unit 24 refers to the table stored in the third parameter storage unit 241 to identify the illumination direction (α(u, v), β(u, v)) of the ranging sensor 321 corresponding to the top-left pixel location 53 (Utl, Vtl) and the bottom-right pixel location 54 (Ubr, Vbr) that are output in step S1.

In the third parameter storage unit 241, illumination directions (α(u, v), β(u, v)) corresponding to all pixel locations of 1≤u≤U and 1≤v≤V may be stored as a table. However, illumination directions (α(u, v), β(u, v)) corresponding to pixel locations at fixed intervals, for example, may be stored as a table. When illumination directions (α(u, v), β(u, v)) corresponding to pixel locations at fixed intervals are stored, an illumination direction (α(u,v), β(u,v)) corresponding to a pixel location that is not stored may be calculated by performing linear interpolation using the illumination directions (α(u,v), β(u,v)) corresponding to the pixel locations that are stored. A method for creating the table is not limited to any particular method.

Next, the second detection unit 24 extracts, from the ranging data output by the ranging sensor 321, ranging data concerning lasers emitted to the range from the identified horizontal angle α(Utl) to the identified horizontal angle α(Ubr) and the range from the identified vertical angle β(Vtl) to the identified horizontal angle β(Vbr) of the ranging sensor 321. That is, the second detection unit 24 extracts ranging data concerning lasers emitted to the range in which the pedestrian detected in step S11 is present.

Then, the second detection unit 24 identifies a location with a high laser reflection intensity out of the extracted ranging data. The second detection unit 24 identifies the coordinates (xLp(t), yLp(t), zLp(t)) of the pedestrian based on the distance to the identified location and the laser illumination angle corresponding to the identified location. A method for identifying the coordinates of the pedestrian based on the extracted ranging data is not limited to any particular method. For example, pieces of ranging data may be replaced with an average value, and then the coordinates of the pedestrian may be identified.

Lastly, the second detection unit 24 converts the identified coordinates (xLp(t), yLp(t), zLp(t)) of the pedestrian in the ranging sensor coordinate system 80 into coordinates (xwp(t), ywp(t), zwp(t)) in the vehicle coordinate system 60, and outputs the coordinates (xwp(t), ywp(t), zwp(t)).

The second detection unit 24 measures, in advance, calibration parameters for conversion between the coordinates (xwp(t), ywp(t), zwp(t)) of the pedestrian in the vehicle coordinate system 60 and the coordinates (xLp(t), yLp(t), zLp(t)) of the pedestrian in the ranging sensor coordinate system 80, and stores the calibration parameters in the fourth parameter storage unit 242. The calibration parameters are represented by rotation (r11, r12, r13, r21, r22, r23, r31, r32, r33) and translation (t1, t2, t3) between the two coordinate systems. The second detection unit 24 converts the coordinates of the pedestrian in the ranging sensor coordinate system 80 into the coordinates (xwp(t), ywp(t), zwp(t)) of the pedestrian in the vehicle coordinate system 60 by calculating [xwp(t); ywp(t); zwp(t); 1]=[r11 r12 r13 t1; r21 r22 r23 t2; r31 r32 r33 t3; 0 0 0 1]×[xLp(t); yLp(t); zLp(t); 1].

(Step S13A: Distance Base Prediction Process)

As in step S5A of FIG. 6, the vehicle base prediction unit 43 of the light control unit 22 predicts the coordinate values of the destination of the pedestrian at a time after a certain time period based on the coordinate values of the pedestrian output in step S12.

(Step S13C: Low Beam Determination Process)

The low beam detection unit 46 of the light control unit 22 determines whether the pedestrian has entered the illumination range of the low beam.

Specifically, the low beam detection unit 46 has stored in the fifth parameter storage unit 461 the range in the vehicle coordinate system 60 to which the low beam reaches. For example, it is assumed that the low beam is emitted to the range as illustrated in FIG. 15. In this case, the maximum and minimum values of the Xw axis at each 1.0 m of the Zw axis are stored as the illumination range of the low beam in the fifth parameter storage unit 461. The low beam detection unit 46 determines whether the pedestrian has entered the illumination range of the low beam by comparing the range to which the low beam reaches stored in the fifth parameter storage unit 461 with the coordinates (xwp(t), ywp(t), zwp(t)) of the pedestrian output in step S12 that has been performed most recently.

(Step S15: Second Illumination Process)

The control execution unit 48 controls the marking light 35 based on the horizontal angles θ and the vertical angles φ calculated in step S14A, the result of determination in step S14B, and the result of determination in step S14C.

Specific control is the same as the control in step S7 of FIG. 6.

*Effects of Second Embodiment* As described above, the vehicle lighting control apparatus 10 according to the second embodiment identifies the location of a pedestrian present outside the illumination range of the low beam, using the ranging sensor 321, and illuminates the range in which the pedestrian is present with light by the marking light 35. This allows the driver to recognize a target object in the distance that cannot be recognized in a situation where only the low beam is used.

In particular, in the first embodiment the location of a pedestrian is identified by emitting light by the marking light 35 and then detecting the pedestrian by the visible-light camera 32. In comparison with this, in the second embodiment the location of the pedestrian can be identified without emitting light by the marking light 35. Therefore, the same effects as those of the first embodiment can be achieved by a simpler process compared with the first embodiment.

REFERENCE SIGNS LIST

10: vehicle lighting control apparatus, 21: detection unit, 22: light control unit, 23: first detection unit, 24: second detection unit, 31: far-infrared camera, 32: visible-light camera, 33: in-vehicle sensor, 34: LED driver, 35: marking light, 36: motor control device, 37: horizontal driver, 38: vertical driver, 39: horizontal stepping motor, 40: vertical stepping motor, 41: pixel base prediction unit, 42: first angle calculation unit, 421: first parameter storage unit, 43: vehicle base prediction unit, 44: second angle calculation unit, 441: second parameter storage unit, 45: vehicle movement prediction unit, 46: low beam detection unit, 47: collision prediction unit, 48: control execution unit, 50: image coordinate system, 60: vehicle coordinate system, 70: light coordinate system, 100: vehicle

The invention claimed is:

1. A vehicle lighting control apparatus comprising processing circuitry to:
   detect a target object present outside an illumination range of a low beam of a vehicle, using a far-infrared camera;
   illuminate a range in which the detected target object is present with a marking light that can illuminate an area at a greater distance when compared with the low beam; and
   detect a location of the target object present in a range illuminated by the marking light, using a visible-light camera,
   wherein when the location of the target object is detected, the processing circuitry illuminates the detected location of the target object with the marking light.

2. The vehicle lighting control apparatus according to claim 1,
   wherein the processing circuitry stops illumination with the marking light when the target object has entered the illumination range of the low beam.

3. The vehicle lighting control apparatus according to claim 1,
   wherein the processing circuitry reduces an intensity of illumination with the marking light when the target object has entered the illumination range of the low beam.

4. The vehicle lighting control apparatus according to claim 1, wherein the processing circuitry changes at least one of a color of light emitted by the marking light and an intensity of light emitted by the marking light, depending on a distance between the vehicle and the target object.

5. The vehicle lighting control apparatus according to claim 3,
wherein the processing circuitry determines a distance between the vehicle and the target object based on the detected location of the target object and a location of the vehicle.

6. The vehicle lighting control apparatus according to claim 1,
wherein the processing circuitry predicts a collision location where there is a probability of collision between the vehicle and the target object, and illuminates the collision location with the marking light.

7. The vehicle lighting control apparatus according to claim 1, further comprising
a memory to store a horizontal illumination direction of the marking light corresponding to a horizontal pixel location of an image obtained by the far-infrared camera,
wherein the processing circuitry identifies a range in which the detected target object is present by referring to the memory, and illuminates the identified range with the marking light.

8. A vehicle lighting control method comprising:
detecting a target object present outside an illumination range of a low beam of a vehicle, using a far-infrared camera;
illuminating a range in which the detected target object is present with a marking light that can illuminate an area at a greater distance when compared with the low beam; and
detecting a location of the target object present in a range illuminated by the marking light, using a visible-light camera,
wherein when the location of the target object is detected, the detected location of the target object is illuminated with the marking light.

9. A non-transitory computer readable medium storing a vehicle lighting control program for causing a computer to execute:
a first detection process to detect a target object present outside an illumination range of a low beam of a vehicle, using a far-infrared camera; and
a light control process to illuminate a range in which the target object detected by the first detection process is present with a marking light that can illuminate an area at a greater distance when compared with the low beam; and
a second detection process to detect a location of the target object present in a range illuminated by the marking light, using a visible-light camera,
wherein when the location of the target object is detected by the second detection process, the location of the target object detected by the second detection process is illuminated with the marking light in the light control process.

* * * * *